United States Patent [19]

Liu et al.

[11] 3,945,253
[45] Mar. 23, 1976

[54] APPARATUS AND METHOD FOR MEASURING FLUID FLOW OVER A WIDE RANGE OF FLUID FLOW CONDITIONS AND VISCOSITIES

[76] Inventors: Frederick F. Liu; Arnold E. Liu, both of 17812 Community St., Northridge, Calif. 91324

[22] Filed: Mar. 28, 1974

[21] Appl. No.: 455,517

[52] U.S. Cl. .................... 73/231 R; 235/151.34
[51] Int. Cl.² .......................................... G01F 1/12
[58] Field of Search......... 235/151.34, 150.1, 151.3, 235/152 IE; 73/194 R, 194 E, 231 R, 3

[56] References Cited
UNITED STATES PATENTS

| | | | |
|---|---|---|---|
| 3,355,947 | 12/1967 | Karlby et al. .................... 73/231 R |
| 3,699,318 | 10/1972 | Underkoffler et al. .......... 235/150.1 |
| 3,700,865 | 10/1972 | Ley ................................. 235/151.34 |
| 3,756,079 | 9/1973 | November ........................ 73/231 R |

OTHER PUBLICATIONS
"Electronic Measurement of Respiratory Flow Velocity," by Nakajima et al., from "Digest of the 7th International Conference on Medical & Biological Engineering," 8–67, (Stockholm, Sweden).

*Primary Examiner*—James J. Gill
*Attorney, Agent, or Firm*—Robert E. Geauque

[57] ABSTRACT

Flowmeter apparatus and method for obtaining accurate measurement of fluid flow, not only in the turbulent flow range, but also in the laminar and transitional flow ranges by compensation of the meter reading. The meter reading is also compensated for change in viscosity of the fluid flowing through the meter. The compensation for flow range is based on the best-fit straight line approach obtained by matching straight line segments to the quantity versus frequency output curve throughout the laminar and transitional ranges, and compensating the flowmeter reading in accordance with the shape of the straight line segments. The compensation for change in kinematic viscosity of the fluid is added to the flowmeter output in accordance with the temperature-viscosity relationship for the fluid and in accordance with a ratio of compensation factors between the actual fluid and a reference fluid.

34 Claims, 17 Drawing Figures

APPARATUS AND METHOD FOR MEASURING FLUID FLOW OVER A WIDE RANGE OF FLUID FLOW CONDITIONS AND VISCOSITIES

BACKGROUND OF THE INVENTION

Conventional flowmeters measure volumetric flowrate by using two factors; (1) the output frequency, and (2) the K factor which is defined as the calibration constant of the flowmeter. The K factor is determined from calibration data or charts and can be considered as being practically constant only in the range where turbulence is fully developed. As the flow rate decreases to below the turbulent flow regime, the K factor varies significantly and frequency output cannot be used as a direct indication of flowrate. By confining measurements to within the fully developed turbulent flow range, present flowmeters operate only when the Reynolds number is high and thereby circumvent the problem of viscous effects at lower Reynolds numbers.

Large hub diameters and smaller blade lengths have been used to achieve higher Reynolds number per unit (volume) flow. However, the useful flow range of the flowmeter is still restricted, since the bearing thrust also increases rapidly according to the square power of the "boosted-up" flow velocity. Thus, the upper flowrate of the turbine flowmeter is limited by the thrust which the flowmeter bearings can tolerate. Also, the induced high flow velocity may also result in unfavorable annular flow resistance, eddy diffusitivity and possibility of cavitation. Even though such measures improve low flow capability of the meter, the lower limit of its measurability is still dictated by the critical Reynolds number, where the transition from turbulence to laminar flow takes place. When magnetic pick-ups are utilized to produce an output frequency, the ability of the flowmeter at low flowrates is further affected by the magnetic coupling which becomes significant relative to the driving torque at lower flowrates. Because of such difficulties as enumerated, most conventional turbulent flowmeters restrict their useful flow range between a narrow span of approximately ten to one. If the flow range to be covered is a wide one, say six hundred to one, several flowmeters must be used. However, the cost of multiple flowmeters with associated additional plumbing and valves, the inconvenience of constantly assembling and disassembling equipment, and the greater complexity of data gathering and processing makes the use of multiple flowmeters undesirable.

SUMMARY OF THE INVENTION

The present invention provides a flowmeter apparatus and method utilizing electronic computation techniques to extend the precisely measurable flow range from turbulent through transitional to laminar flow regimes with a single flowmeter, by superimposing frequency corrective terms electronically to the direct output of the flowmeter. The direct reading of the true flowrate over an extended wide flow range is possible without constantly requiring referencing or reading of a calibration chart or requiring post-test manual calculation and calibration. The invention does not deal with the full amount of the flowmeter's direct output, but only superimposes or algebraically adds a corrective term, thus greatly reducing the so-called linearization error which results when the same percentage computation error is applied to the entire value of the flowmeter output.

In addition, the invention also provides quantitative correction of viscosity effects. Correcting of viscosity effects over a wide range of viscosity is accomplished through a single corrective system. Simultaneous correction in terms of critical Reynolds number and the amount of correction required at any flow rate, are accomplished according to established fluid dynamic concept and by means of practical electronic technique.

More particularly, the present invention provides accurate direct indication of the true flowrate over extended flow range, and over a range of viscosity by using the best-fit straight line principle. This approach can satisfy nearly all flowmetering requirements, which is not possible with the ordinary linearization approach which often unrealistically presupposes that the calibration line passes through zero at zero flowrate. The invention is based on the usage of (1) a super linearized slope of the "output frequency versus flowrate" calibration curve which is made constant and linear throughout the extended flow range and (2) the superimposing of several correction frequencies to the flowmeter's original output frequency. The output representing the true flow rate is expressed in frequency form and the flow rate can be totalized to provide the volume flow. With this invention, extended rangeability of turbine flowmeters for effective flow measurement has been increased from the conventional ten to one range to in excess of six hundred to one.

DESCRIPTION OF THE PREFERRED EMBODIMENT

Figure 1:
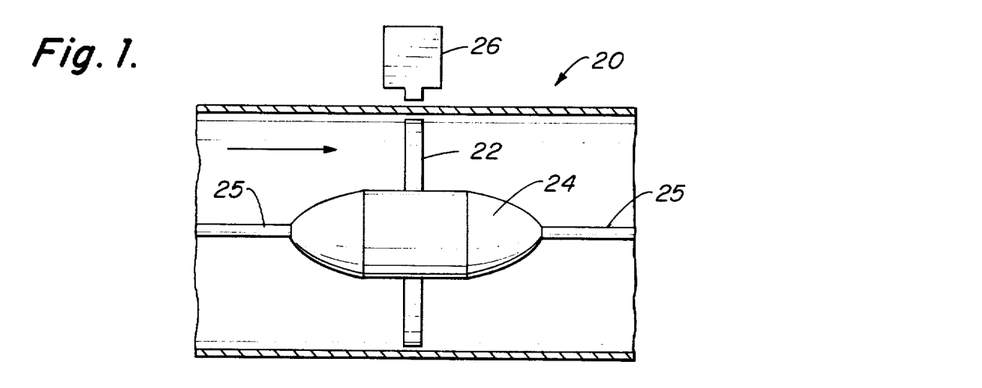
FIG. 1 is a sectional schematic of a convention flowmeter having a pick-up.
Figure 2:
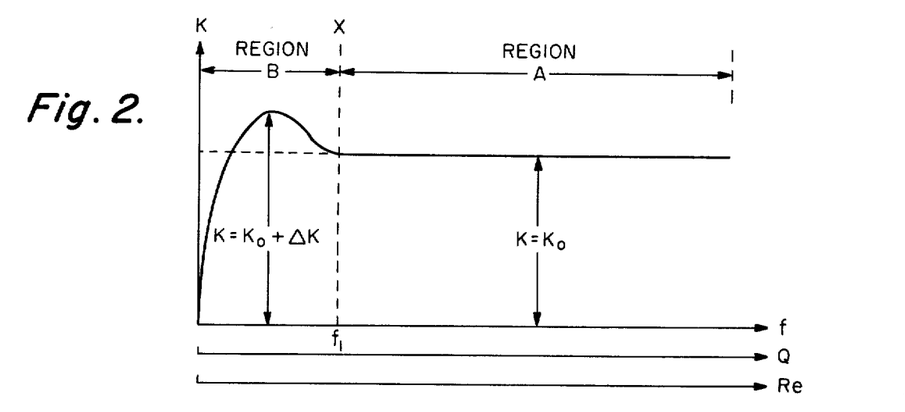
FIG. 2 is a plot of calibration factor versus frequency over the laminar and transitional flow ranges (Region B) and over the turbulent range (Region A)

A section of a conventional flowmeter 20 is illustrated in FIG. 1 and has a plurality of blades 22 secured to a rotor hub 24 which is centrally supported by shaft 25. The movement of each blade 20 past pick-up 26 (for example, a magnetic or other type of pick-up such as disclosed in U.S. Pat. 3,135,116) produces a pulse output having a frequency which is utilized as a measure of flowrate. FIG. 2 is a plot of calibration constant K (in units of pulse/gallons) versus frequency output of the flowmeter. Since the K factor is defined as the quotient of the frequency and volumetric flow, it is clear that in Region A which is the turbulent flow region, the frequency output divided by the constant K factor ($K_o$) yields the correct volumetric flowrate. However, in Region B, which is the transitional and laminar flow range, the K factor becomes a function of Reynolds number or of flowrate, or of the flowmeter's frequency output. Since the K factor is constantly changing in Region B, calibration factor $K_o$ cannot be used for determination of flow Q since erroneous reading of the flowrate would result.

Figure 3:
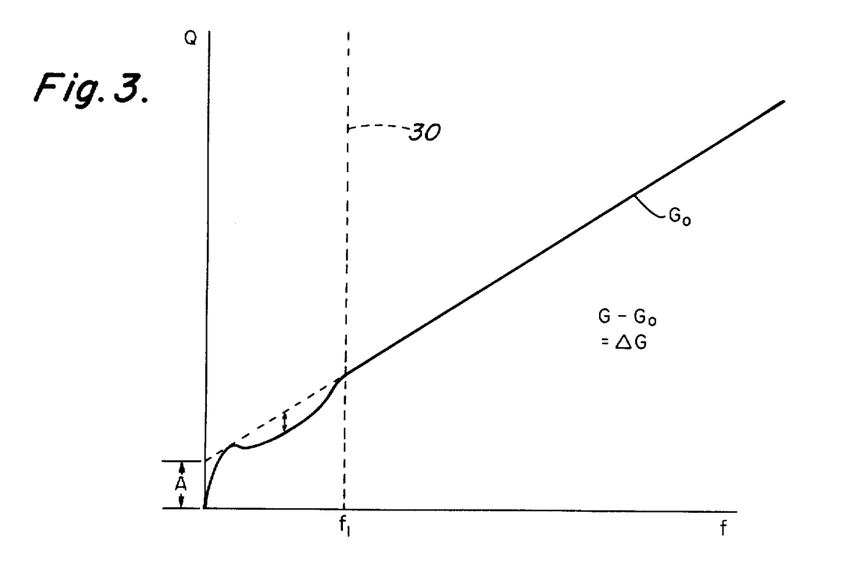
FIG. 3 is a plot of quantity flow (Q) versus meter output frequency $(f)$.

For most turbine flowmeters, extensive data has shown that the actual flow rate versus output frequency can be best expressed as a best-fit straight line which is describable by a slope G and an intercept A, so that $Q = A + f \cdot G$. Here G is analogous to (1/K) mentioned above, except that G is always described in conjunction with an intercept A. The plot of this relationship is illustrated in FIG. 3, and as special cases of this equation we have $$Q = A + f \cdot G_o,$$

for $f > f_1$ (turbulent flow range) and $$Q = A + f \cdot (G_o + \Delta G),$$

for $f < f_1$ (transitional and laminar flow ranges). Dividing all the terms by $G_o$, the following general relation results:

$$\frac{Q}{G_o} = f + f \cdot \left(\frac{\Delta G}{G_o}\right) + \frac{A}{G_o}$$

For constant viscosity, it is apparent that over the turbulent flow range, $\Delta G = 0$ and $$\frac{Q}{G_o} = f + \frac{A}{G_o}.$$

Since A, $G_o$ and ($A/G_o$) are constants, or can be treated as such, the correct indication of the actual flowrate can be obtained by algebraically adding the term $$f \left(\frac{\Delta G}{G_o}\right) \text{ where } \frac{\Delta G_o}{G_o}$$

is a function of $f$, allowing $$f \left(\frac{\Delta G}{G_o}\right)$$

to be treated as $\Phi (f)$. Thus, $$\frac{Q}{G_o} = f + \Phi (f) + \frac{A}{G_o}$$

The present invention provides for the adding, or, using the frequency super-position concept, superimposing two corrective frequency terms of ($A/G_o$) and $$f \left(\frac{\Delta G}{G}\right).$$

The term "superlinearizer" is used to describe the process, and the word "linearizing" is no longer adequate since the best-fit straight line may or may not pass through the origin.

From the flow calibration data over the turbulent flow range, the best-fit straight line can be determined (either by calculation or plotting) and thus the quantities A and $G_o$. Knowing these constants, $\Delta G$ can be determined over the transitional and laminar flow range from the equation $$\Delta G = \frac{Q - A}{f} - G_o.$$

Figure 4:
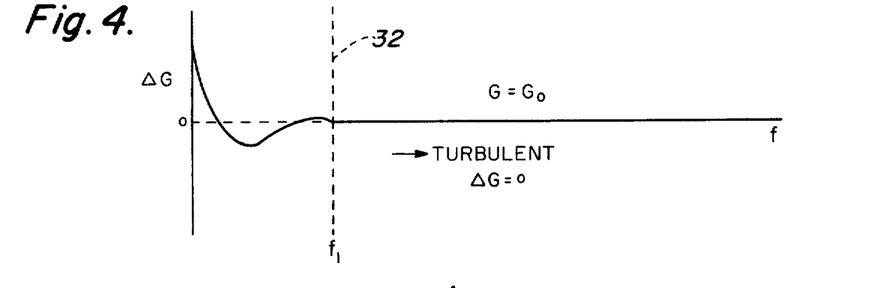
FIG. 4 is a plot of the slope variation ($\Delta G$) against frequency $(f)$ illustrating the variation occurring in the laminar and transitional flow ranges.

Thus, all of the terms A, $G_o$ and $\Delta G$ corresponding to any value of ($f$) can be determined from the flow calibration data. In FIG. 3, it is noted that in the laminar and transitional flow range to the left of frequency ($f_1$) line 30, there is a continually changing slope, while to the right of line 30 in the turbulent range, the slope is constant at $G_o$. FIG. 4 is a plot of $\Delta G$ versus frequency and shows that there is a considerable variation in $\Delta G$ in the laminar and transitional flow range to the left of frequency ($f_1$) line 32, whereas to the right of line 32 in a turbulent flow range, G is equal to $G_o$ and $\Delta G$ is equal to zero.

Figure 5:
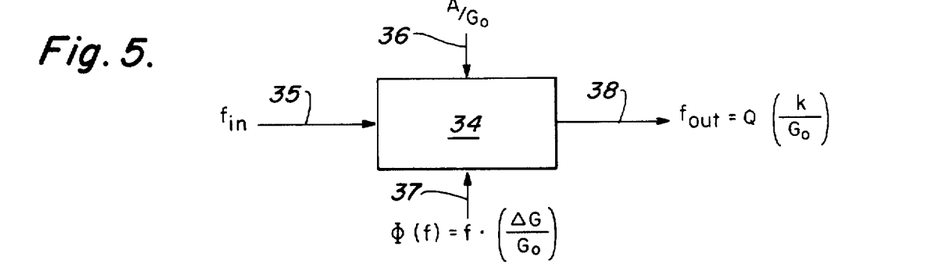
FIG. 5 is a diagrammatic illustration of the manner in which the compensation factors are added to the flowmeter output.

A frequency adder 34 illustrated in FIG. 5 can be used to determine the value of ($Q/G_o$).

The instrument receives the direct frequency output $f$ (or its multiple) from the flowmeter from line 35, and the constant correction term ($A/G_o$) is added through line 36 and the value of $$f \left(\frac{\Delta G}{G_o}\right)$$

or $\Phi (f)$ is added through line 37 in order to obtain the frequency output $$Q \left(\frac{k}{G_o}\right)$$

in line 38. The frequency output is ($Q/G_o$) and is multiplied by the line constant $k$ in order to obtain a direct reading of flow quantity. The resultant output then becomes:

$$f_{out} = f_{in} + \frac{A}{G_o} + f \cdot \left(\frac{\Delta G}{G_o}\right)$$

where $A$ and $G_o$ are all constants. The output frequency $$Q\left(\frac{k}{G_o}\right)$$

is directly proportional to the volumetric flow rate Q. The totalization or time integration of this frequency output then provides the volume of flow during any selected period of time.

Over the turbulent flow regime, namely for any flow rate above the critical Reynolds number, when $f > f_1$, the value of the superimposed correction term $\Phi(f)$ must be equal to zero. If flow rate is below this critical Reynold's, number, namely in the transitional flow or laminar flow regime where $f < f_1$, the amount of correction $\Phi(f)$ becomes a function of the flow rate and therefore of the flowmeter's frequency output. The critical Reynolds number for a flowmeter of given size and flow configuration is, of course, determined by the viscosity of the fluid in question.

Figure 6A:
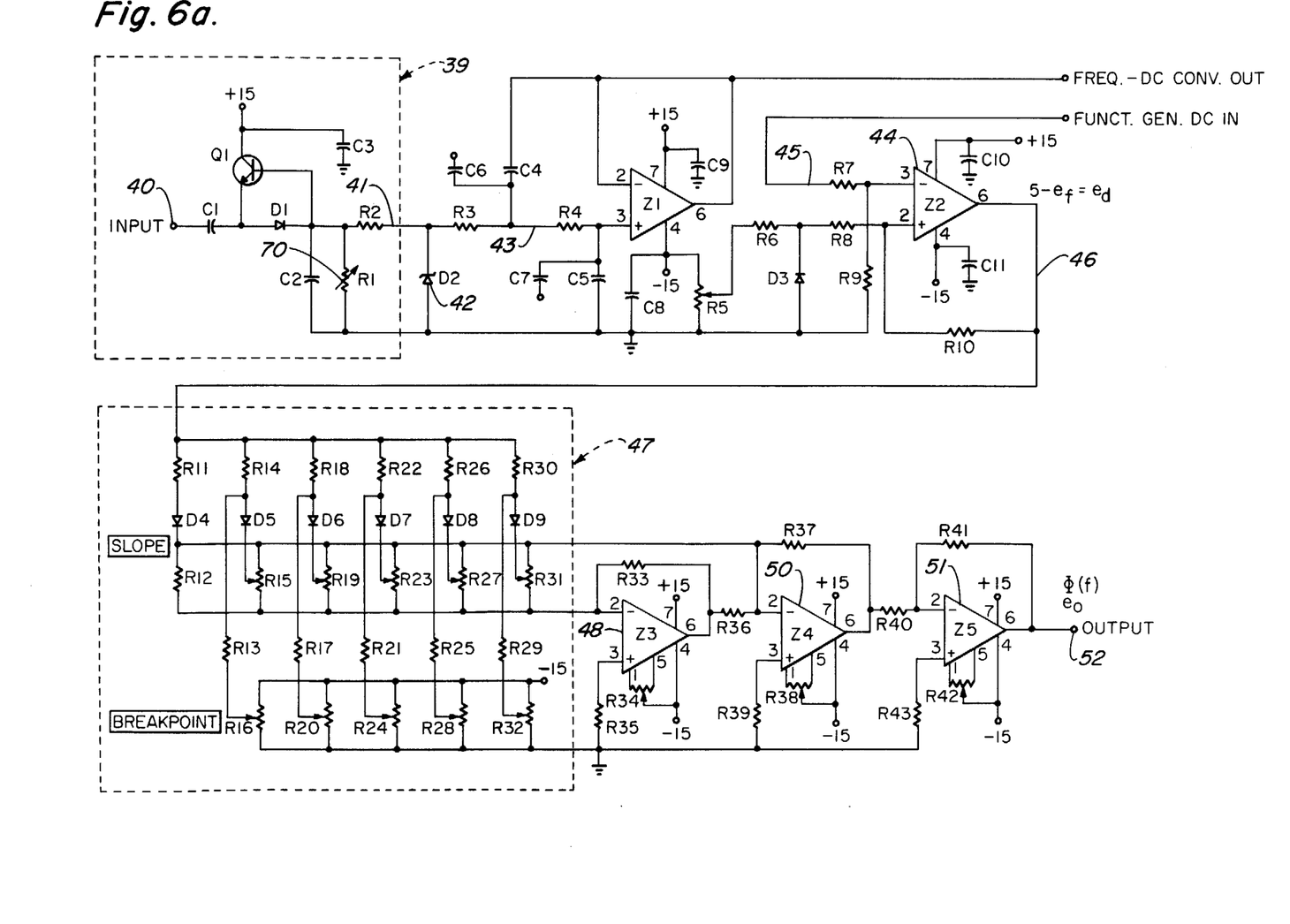
FIG. 6A is a circuit schematic for computing a compensating factor for the laminar and transitional flow ranges.

FIG. 6A is a schematic illustration of the circuitry in which the output frequency of the flowmeter is converted to a voltage signal which is a function of frequency and is equal to $$f\left(\frac{\Delta G}{G_o}\right).$$

The frequency input from the flowmeter is received at terminal 40 by a diode pump circuit 39 which produces a voltage in line 41 proportional to frequency input. The zener diode 42 limits the voltage to 5 volts in line 43 so that the voltage $e_f$ in line 43 of 5 volts or below is connected with differential amplifier 44 which also receives a constant input of 5 volts in line 45 so that output of the differential amplifier is $5 - e_f = e_d$ and appears in line 46. The pump circuit is so adjusted that the output is made precisely 5 volts at critical Reynolds number, namely at frequency $f_1$, so that at $f_1$, the output of the differential amplifier 44 is zero and at all other frequencies, the amplifier output is $e_d = 5 - e_f$. Voltage $e_d$ is applied to a diode-resistor type function generator circuit 47 through the line 46.

Figure 7:
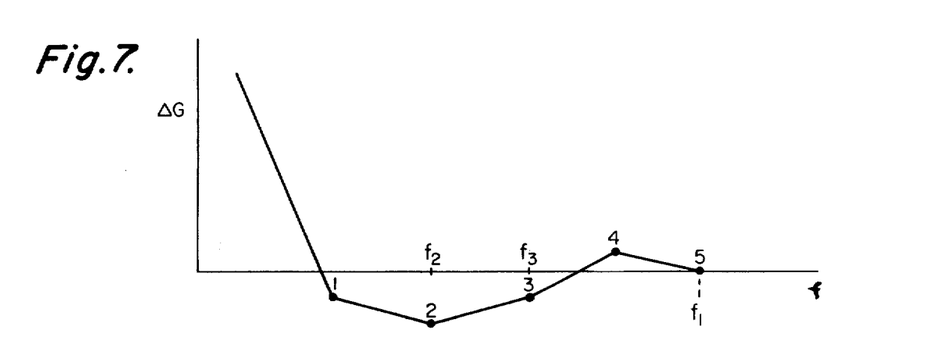
FIG. 7 is a plot of $\Delta G$ versus $(f)$ with the frequency axis expanded to illustrate the curve divided into straight line segments.
Figure 8:
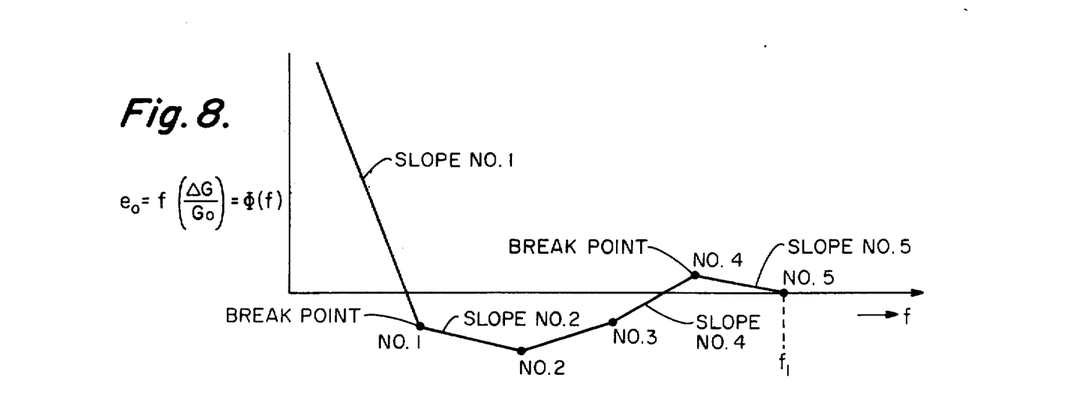
FIG. 8 is a plot of compensating factor voltage $(e_o)$ versus frequency.

In FIG. 7, the frequency coordinate of the $\Delta G$ versus frequency curve has been expanded to illustrate that the frequency up to frequency $f_1$ can be divided into a number of break points 1–5 between which straight line segments can be drawn to closely approximate the actual curve of FIG. 4. Each straight line segment has a different slope and extends between two break points. Frequencies at which these break points 1 through 5 occur are determined by the set value of resistors R16, R20, R24, and R32, respectively, in the schematic of FIG. 6A. The slope of segment 1 the curve up to point 1 is determined by the set value of resistor R15 and the slope of the following segments between successive break points is determined by the setting resistors R19, R23, R27 and R31, respectively. Output of the diode resistor function generator 47 is fed to operational amplifiers 48, 50 and 51 and the output at terminal 52 is voltage $e_o$ which is equal to $$f\cdot\left(\frac{\Delta G}{G_o}\right)$$

and to $\Phi(f)$. In FIG. 8, output $e_o$ $$\left(=\Phi(f) = f \cdot \left(\frac{\Delta G}{G_o}\right)\right)$$

is plotted against frequency and the break points 1–5 and the curve segments 1–5 are designated. It is apparent from FIG. 8 that the function generator 47 produces a quantity to be added to the output frequency of the flowmeter until the frequency $f_1$ is obtained and thereafter as the output frequency $(f)$ increases, voltage $e_o$ is zero.

Figure 6B:
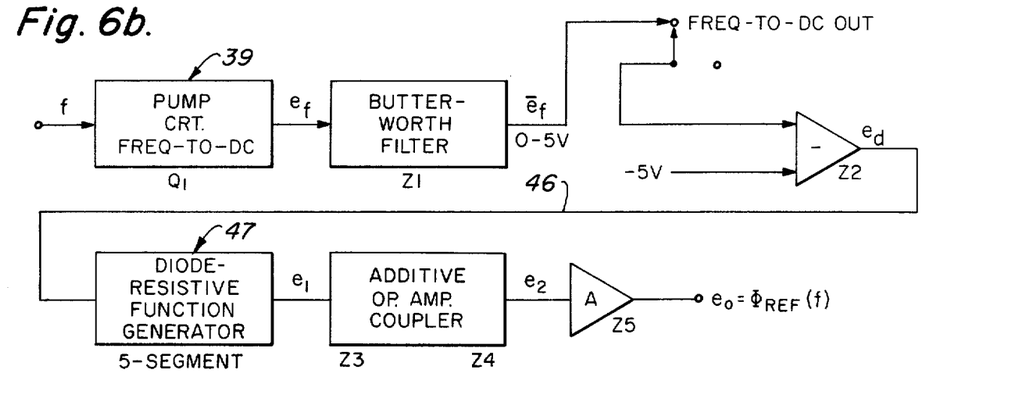
FIG. 6B is a block diagram of the circuit of FIG. 6.

A schematic diagram of the circuit of FIG. 6A is illustrated in FIG. 6B. Transistor Q1, together with its associate capacitor, diode and resistive circuit elements, forms the frequency to DC converter diode pump circuit. The output is applied to a Butterworth filter comprising operational amplifier $Z_1$. Thus, at the output $\overline{e}_f$ of amplifier $Z_1$, the DC output has been filtered and smoothed, and $\overline{e}_f$ is linearly proportional to the mean value of the input frequency. The voltage $e_f$ is then applied to the differential amplifier $Z_2$ which has at its other input a constant voltage of $-5$ volts and the output $e_d$ in line 46 is $e_d = -(5-e_f)$.

The voltage $e_d$ is then applied to the diode-resistive five segment function generator for proper adjustment of the slope and break points. By proper additive coupling and impedance transformation with amplifiers $Z_3$ and $Z_4$, the value $\Phi(f)$ can then be generated. The diode-resistive function generator 47 approximates the function $\Phi(f)$ by means of polygonal functions segment-by-segment.

Figure 6C:
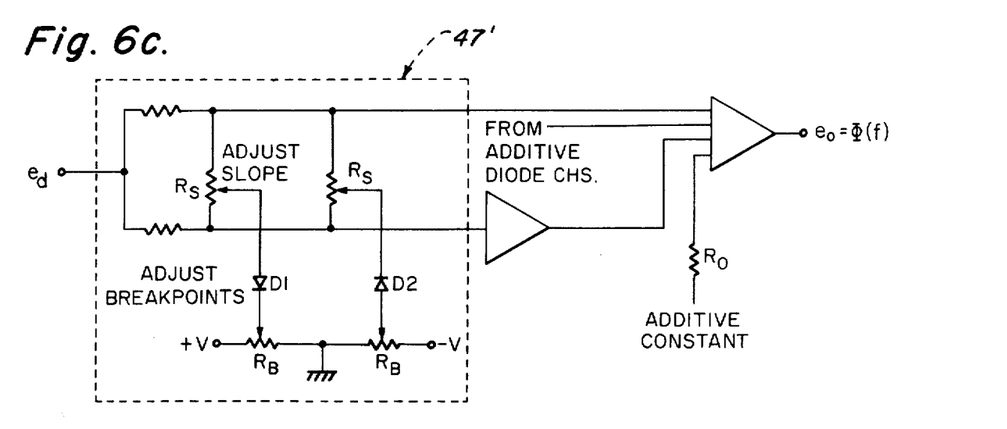
FIG. 6C is a schematic illustration of the principle of the function generator incorporated in FIG. 6A.

FIG. 6C is a schematic diagram of FIG. 6A which illustrates the principle (but not the complete circuit) utilized in the function generator 47. The basis of the function generator technique is to use a number of diodes as voltage sensitive switches, the circuit of each diode is closed if the diode's bias voltage is positive, and the circuit is open if the bias is negative. The bias voltage can be negative as well as positive, so that the breakpoint of the characteristic curve can be adjusted. If the resistor in series with the diode is variable, the slope of the characteristics curve can be adjusted. The function generator 47 consists essentially of the combination of a number of diode-resistor circuits. The transfer characteristics (output voltage versus input voltage; or $iR$ versus $e_d$ across the variable resistor) of each resistive network containing a biased diode switch is utilized to shape a segment of the desired function $\Phi(f)$. This characteristic is generally linear between break points, namely, points corresponding to the input voltage levels which cause a diode switch to conduct or to cut-off. The slopes of the line segments, as well as the breakoff voltage points, can be adjusted by suitable choice of resistances and biased values. Referring to FIG. 6C, only two diode resistor circuits are schematically shown for purposes of illustration and the resistors $R_s$ for adjusting the slope and the resistors $R_B$ for adjusting rhe breakpoints are schematically illustrated. By combining a number of such diode resistor networks together and using a common resistor $R_O$ for the ouput, the desired function $\Phi(f)$ is obtained.

Figures 9, 10:
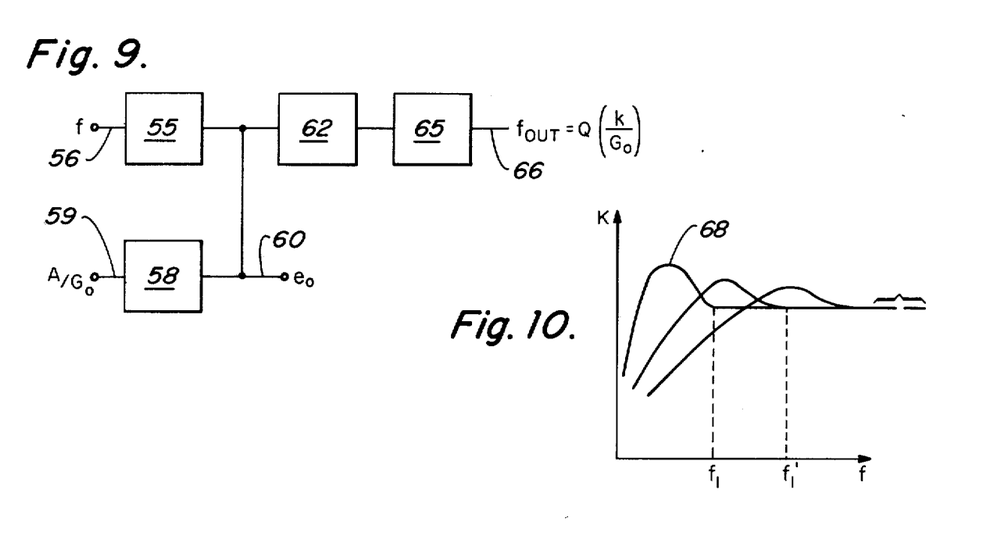
FIG. 9 is a block schematic showing the various compensating factors combined with the flowmeter output to obtain a corrected flow value over the full flow range.
FIG. 10 is a plot of calibration factor (K) versus frequency $(f)$ for fluids of different kinematic viscosity.

One manner in which the voltage $e_o$ can be added to the output frequency of the flowmeter and to $(A/G_o)$ is illustrated schematically in FIG. 9. Block 55 is a frequency to current (or voltage) converter which receives the frequency input from the point 56 connected to the flowmeter. A frequency to current (or voltage) converter 58 receives an input signal from terminal 59 which is a constant value corresponding to $(A/G_o)$. Function generator output voltage $e_o$ (or equivalent current) is added through line 60 to the outputs of converters 55 and 58 and the three values are summed in summing circuit 62. Current (or voltage) to frequency converter 65 then reconverts the total current (or voltage) back into a frequency output in line 66 which is the frequency output designated as $$Q\left(\frac{k}{G_n}\right)$$

in FIG. 4. Any suitable known type of frequency to current (or voltage) converters and adders can be utilized in order to add $e_o$ to the frequency derived from the flowmeter and the constant representing $(A/G_o)$. Instead of converting the frequency to current (or voltage) and then adding the signals and then converting back to frequency, certain known devices can be utilized to add the frequencies directly together. Such a device is designated as Frequency Adder Model FA-30 produced by Elastronics, Co., a Division of Quantum-Dynamics of Tarzana, Calif.

VARIABLE VISCOSITY COMPENSATION

In addition to compensating for the changes in flow characters in the laminar and transistional regions, it is important to compensate for the effects of varying fluid viscosity. For a given flowmeter, Reynolds number is a function of the kinematic viscosity and the flow rate Q, which can also be expressed by the frequency output $(f)$. If the viscosity varies, the critical Reynolds number point corresponding to $(f_1)$ at which turbulent flow commences also changes. In other words, one of the principal effects of viscosity change is to shift the position of the hump 68 (see FIG. 10) of the calibration curve along the horizontal axis relative to its position when the fluid viscosity is at a reference value, such as a kinematic viscosity of ten centistoke. FIG. 10 illustrates the change in the shape of the calibration curve (K versus frequency) as the frequency $f_1$ increases to $f_1'$ with a change in fluid viscosity. The first step in the automatic correction of the viscosity effect is therefore to place the "hump" at its proper position along the X axis; namely, the axis representing the flowmeter's frequency output (or the volumetric flowrate, or Reynolds number). This next step is to use a hump of the correct amplitude and shape corresponding to the viscosity under the flow condition.

Figures 11, 12, 13, 14A:
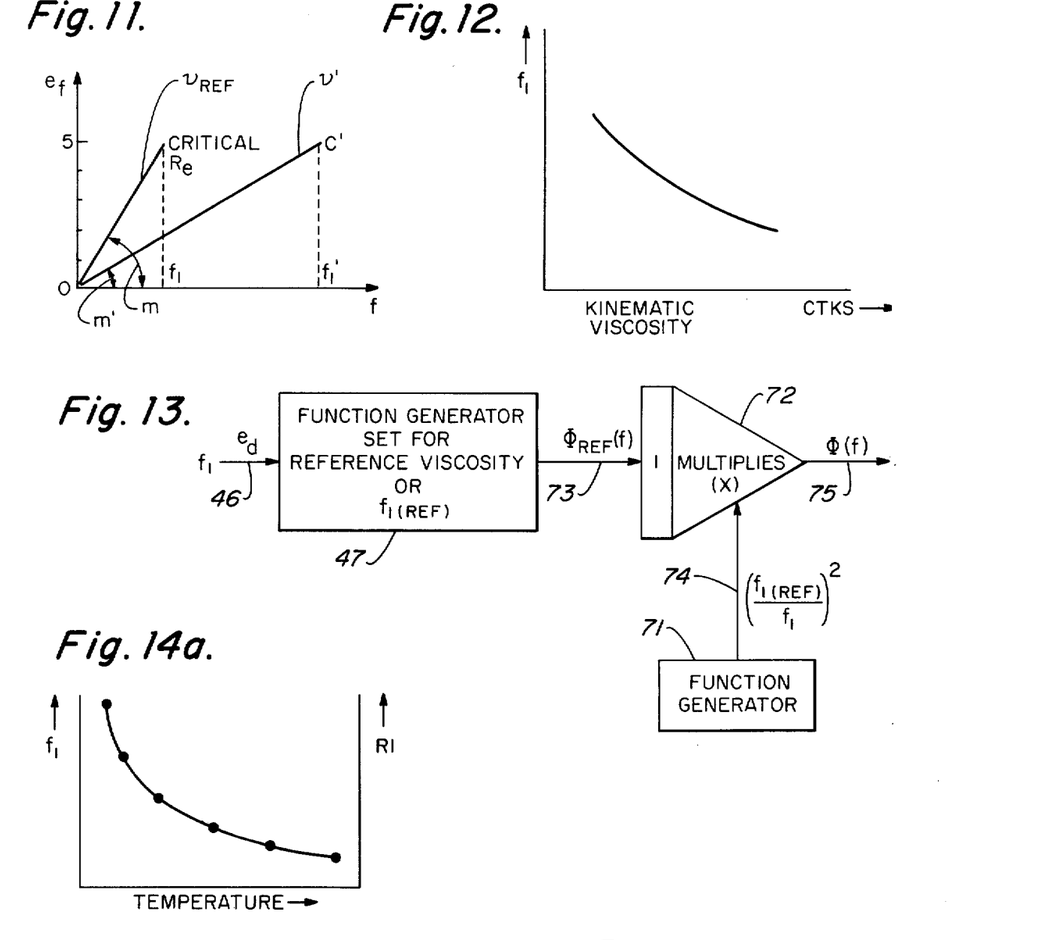
FIG. 11 is a plot voltage $(e_f)$ versus frequency $(f)$ for two fluids of different kinematic viscosity.
FIG. 12 is a plot of $(f_1)$ versus kinematic viscosity of different fluids to be measured.
FIG. 13 is a diagrammatic diagram of the manner in which the output of function generator 47 is corrected for viscosity.
FIG. 14A is a plot of variation in frequency $f_1$ and in the value of resistor R1 with temperature.

To accomplish the first step, it can be shown that as the position of the hump along the X axis changes, the slope of the line joining the origin of the graph to the point $f_1'$ (representing the critical Reynolds number) varies as illustrated in FIG. 11 which is a plot of $e_f$ versus frequency. Higher kinematic viscosity corresponds to a higher frequency at which critical Reynolds number is reached (turbulent flow) and produces a hump of less magnitude; and, lower kinematic viscosity corresponds to a lower frequency at which turbulent flow commences, but the hump has higher amplitude. In FIG. 11, a line OC is drawn between frequency $f_1$ for the reference viscosity and this line has a slope $m$. At higher kinematic viscosity $\nu'$, turbulent flow commences at a higher frequency $f_1'$ and the line OC' has a slope $m'$ which is less than the slope $m$. Each slope $m'$ is associated with a particular frequency region for applying the $\Phi(f)$ or $$f\left(\frac{\Delta G}{G_o}\right)$$

correction. The value of the resistor R1 in the frequency-to-D.C. converting diode pump circuit of FIG. 6A can be varied to vary the slope $m'$ as required by different viscosity. In other words, changing the value of R1 (in FIG. 6A) varies the frequency range so that the voltage will build up from zero to 5 volts when frequency $f'_1$ is reached. Beyond $f'_1$, the correction $\Phi(f)$ is zero since $e_d$ is zero and no correction is needed. It is only when $e_f$ is less than 5 volts that an amount of $\Phi(f)$ or $$f\left(\frac{\Delta G}{G_n}\right)$$

enters into the correctional process as described previously.

It is known that the kinematic viscosity $\nu$ is affected by both the fluid temperature and pressure according to the following empirical relationship.

In the high temperature portion of liquid range:

$$\eta(\text{Viscosity}) \alpha \exp\left(\frac{1}{T}\right) ; \text{ or,}$$

$$\nu = \frac{\eta}{\rho} \quad \alpha \quad \frac{\exp\left(\frac{1}{T}\right)}{\rho}$$

where $\nu$ is the kinematic viscosity $$=\left(\frac{\eta}{\rho}\right)$$

in centistokes and $\eta$ is absolute viscosity in poises.

In the lower temperature range:

$$\eta \alpha \exp\left[\frac{1}{(T+A)}\right] ; \text{ or, } \nu \alpha \frac{\exp\left[\frac{1}{(T+A)}\right]}{\rho}$$

where $T$ is temperature, $A$ is an empirical constant, and $\rho$ is the density, which is also a function of temperature. Thus, the temperature-viscosity relationship can be utilized to provide automatic correction of the viscosity effect. This is done by changing the slope $m$ of the "$e_f$ versus $f$" line OC with the programmable circuit of the diode pump. The programmable circuit receives the output T of a temperature transducer which is used to control and to vary $m'$ by means of an analog function generator, or through a digital function generator such as a "Read-only-memory" (ROM). The effect of this control is analogous to the control of the resistor R1 in the frequency-to-D.C. diode pump circuit, which can be accomplished, for example, by the use of a field effect transistor as R1. The setting and design of this programmable circuit is obtained from data analyses from calibration tests performed over the range of viscosities. As a result, frequency $f'_1$ corresponding to the critical Reynolds number at any fluid viscosity, can also be shifted relative to $f_1$ to meet the requirement for viscosity effect correction. The position of the hump is thus automatically adjusted along the X axis. In a semi-automatic system, the resistor R1 can be manually adjusted by use of a temperature or viscosity dial arm 70 in accordance with a separate measurement of temperature.

In the second correctional step, the amplification of the $\Delta G$ signal according to kinematic viscosity can be accomplished simultaneously with the first step of automatically shifting the $f'_1$ relative to $f_1$. The following empirical relationship between two calibration factors, G and $G_o$, based on the Reynolds number Re can be used for this purpose.

$$\frac{1}{G} = \frac{1}{G_o} - \frac{1}{2} Re^2$$

$$\frac{G - G_o}{GG_o} = \frac{1}{2} Re^2$$

Since $G - G_0 = \Delta G$ and $GG_0$ can be approximated as $G_o^2$ and designating $\Delta G_{(REF)}$ for the value of $\Delta G$ corresponding to the reference viscosity, then:

$$\Delta G = \frac{1}{2} Re^2 \, G_o^2$$

$$\Delta G_{(REF)} = \frac{1}{2} Re_{(REF)}^2 \, G_o^2$$

one may also transform $R_e$ by means of the ratio $(f/f_1)$, thus, by proportionality:

$$\Delta G = \text{Const.} \, (f/f_1)^2 \cdot \Delta G_{(REF)}$$

$$= \text{Const.} \left[\frac{f}{f_1}\right]^2 \cdot \Delta G_{(REF)}$$

For the constant viscosity case, the effects of $\Delta G$ are included in the corrective term $$\Phi(f) = f \cdot \left(\frac{\Delta G}{G_o}\right).$$

which is only valid for a particular viscosity $\nu_{REF}$. Designating this term as $\Phi_{REF}(f)$, and substituting:

$$\frac{\Phi(f)}{\Phi_{REF}(f)} = \left[\frac{f_{1(REF)}}{f_1}\right]^2$$

The ratio of $$\frac{\Phi(f)}{\Phi_{REF}(f)}$$

is the amplification, or gain, to be applied to $\Phi_{REF}(f)$ in order to obtain $\Phi(f)$.

The circuitry for utilizing the above ratio will now be described. During the multi-viscosity universal flow calibration of the flowmeter, it is simply to obtain from the calibration curves the value of $f_1$ corresponding to kinematic viscosity. The $f_1$ if determined from the point when the calibration factor K or G enters its flat region, shortly after the hump. Over the range of viscosity of interest, the plot of FIG. 12 may be constructed from the empirical data. For each viscosity, the value of $f_1$ is essentially a fixed value and $f_{1(REF)}$ can be chosen for a reference kinematic viscosity, say, corresponding to ten centistokes. With this value, each viscosity effect can be described in terms of the ratio $$\left[\frac{f_{1(REF)}}{f_1}\right]^2$$

as set forth above.

In a semi-automatic device for viscosity correction, a potentiometer dial can be graduated in units in kinematic viscosity or temperature and each dial setting can provide a (non-linear) functon by means of a function generator 71 having a voltage output corresponding to $$\left[\frac{f_{1(REF)}}{f_1}\right]^2.$$

Any well known circuitry can be utilized and by applying the viscosity or temperature value, the output of the function generator 71 can provide directly the above value.

A complete block diagram of the viscosity correction system is illustrated in FIG. 13. The function generator 47 (FIG. 6), which is used to generate $\Phi_{REF}(f)$ with input $(f)$ provided by the flowmeter, is illustrated in block form and receives the value $e_d$ from line 46. The value of the voltage $e_f$ becomes equal to 5 volts at the frequency $f_1'$ corresponding to the setting of the dial 70 of resistor R1 so that the value $e_d$ becomes zero at this frequency. The $\Phi_{REF}(f)$ output of function generator circuit 47 is set by using calculated value of resistors and diodes. The output of the function generator 47 is fed into a multiplier 72 through line 73 and also the value $$\left[\frac{f_{1(REF)}}{f_1}\right]^2$$

corresponding to the flowing fluid viscosity is fed from function generator 71 by line 74 to the multiplier 72. The multiplied output in line 75 is $\Phi(f)$ which has been compensated for both fluid viscosity and for the laminar and transitional flow range effects. It is understood that when the frequency of the flowmeter becomes greater than $f_1$ the input into the function generator 47 is zero and therefore no correction $\Phi(f)$ is applied. However, when the output frequency of the flowmeter is less than $f_1$ of the fluid, a signal output is developed by the function generator 47 which is compensated by the quantity $$\left[\frac{f_{1(REF)}}{f_1}\right]^2.$$

Figure 14B:
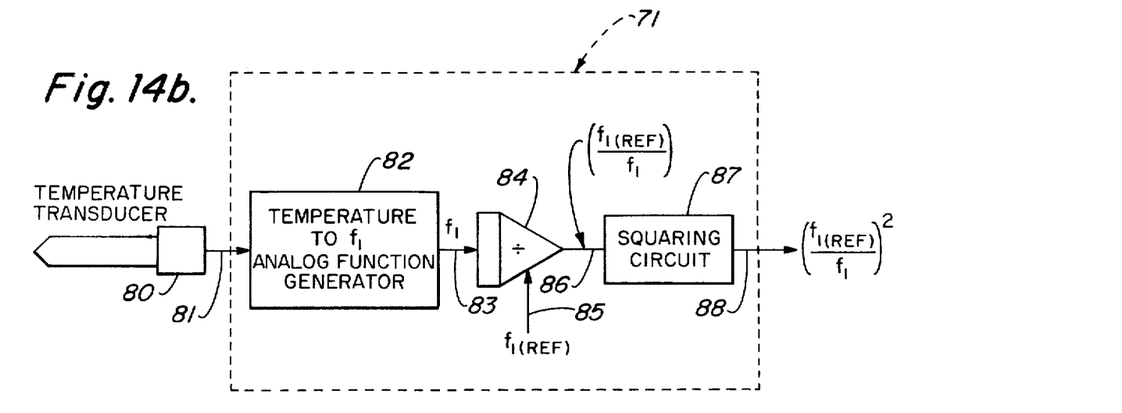
FIG. 14B is a schematic circuit diagram for the function generator which produces a viscosity compensation.

A block diagram of function generator 71 for generating this quantity is shown in FIG. 14B. The output of temperature transducer 80 is applied by line 81 to a temperature-to-$f_1$ analog function generator, so that an output $f_1$ is generated in line 83. This output is applied to an analog divider circuit 84 which also receives another input $f_{1(REF)}$ from line 85. The resultant analog computation process yields a quotient $$\left[\frac{f_{1(REF)}}{f_1}\right]$$

which is applied by line 86 to squaring circuit 87 which produces the output $$\left[\frac{f_{1(REF)}}{f_1}\right]^2$$

in line 88 connecting with line 74.

During the calibration process, a plot of $f_1$ versus fluid temperature (see FIG. 14A) can be made, since fluid temperature directly affects the kinematic viscosity at a given fluid pressure. As also indicated, the value for the setting of resistor R1 can be obtained as a function of temperature. The temperature transducer 80 is used to provide the required fluid temperature measurement which is applied to the function generator 82. This generator can be an analog multi-segment function generator of the diode-resistor type similar to generator 47, except that different settings of slopes and breakpoints are used. The output of this function generator is $f_1$ which is applied to a commercially available electronic linear four-quadrant multiplier-divider circuit (such as motorola MCC1595). This circuit also receives the input $f_{1(REF)}$ which is a constant quantity provided, for example, by setting a graduated potentiometer. The squaring circuit 87 can also be of any conventional design, such as While analog computation has been disclosed, it is understood that digital calculator or computing circuitry could also be utilized to accomplish the purpose of the function generator 75.

It is apparent from the above discussion that the present invention provides a means for obtaining an accurate measure of fluid flow, not only in the turbulent flow range, but also in the laminar and transitional flow ranges. In addition, the reading of the meter is corrected for change in viscosity of the fluid flowing through the meter. The correction for flow range conditions is obtained by matching a straight line to segments of the Q versus $f$ curve through the laminar and transitional ranges and compensating the flowmeter reading in accordance with the straight line segments. To compensate for the change in viscosity of fluid, the frequency range over which flow compensation is added to the flowmeter output is varied in accordance with the temperature-viscosity relationship for the fluid. The amount of the flow correction in the laminar and transitional flow ranges is also varied in accordance with the viscosity of the fluid in order to more nearly match the actual flow of the fluid. While various circuits have been suggested to accomplish the performance of the invention, it is understood that any suitable standard equipment can be utilized instead.

What is claimed is:

1. An apparatus for obtaining a measure of fluid flow rate over the laminar, transitional and turbulent flow range comprising:
   a turbine flowmeter located in a fluid flow line and producing a frequency output signal variable with flow rate;
   means for comparing said output signal with a constant reference value to produce a difference signal which is zero throughout the turbulent flow range of the fluid through the flowmeter commencing at frequency ($f_1$);
   means responsive to said difference signal for producing a compensating signal for compensating said output signal of said flow meter over the laminar and transitional flow ranges for variations from quantities indicated by the straight line function of flow rate versus frequency in the turbulent flow range; and
   means for combining said compensating signal with said flowmeter output signal to obtain a correct value of flow rate in the laminar and transitional flow ranges.

2. An apparatus as defined in claim 1 wherein:
   said comparing means includes means for compensating said comparing means for variation in turbulent flow range of a measured fluid.

3. An apparatus as defined in claim 1 wherein said compensating signal producing means comprises:
   means for producing said compensating signal with values represented by successive straight line segments matched to the curve of the actual flow rates in the laminar and transitional flow ranges versus said flowmeter output.

4. An apparatus as defined in claim 1 having means for compensating the flowmeter output with a constant value proportional to the constant slope of the flow rate versus frequency output curve of the flowmeter throughout the turbulent flow range.

5. An apparatus as defined in claim 1 having means for modifying said compensating signal for changes in viscosity of the flowing fluid;
   said modifying means comprising means for producing a signal equal to the squared ratio of frequency ($f_1$) of a reference fluid to the frequency $f_1$ of the flowing fluid $$\left[\frac{f_{1(REF)}}{f_1}\right]^2.$$

6. An apparatus as defined in claim 5 wherein:
   said combining means comprises a multiplier for multiplying said squared ratio with said compensating signal.

7. An apparatus as defined in claim 1 wherein:
   said comparing means includes means for compensating said comparing means for variation in turbulent flow range of a measured fluid; and
   said compensating signal producing means comprises means for producing said compensating signal with values represented by successive straight line segments matched to the curve of the actual flow rates in the laminar and transitional flow ranges versus said flowmeter output.

8. An apparatus as defined in claim 1 wherein:
said compensating signal producing means comprises means for producing said compensating signal with values represented by successive straight line segments matched to the curve of the actual flow rates in the laminar and transitional flow ranges versus said flowmeter output;

means for modifying said compensating signal for changes in viscosity of the flowing fluid; and said modifying means comprising means for producing a signal equal to the squared ratio of frequency ($f_1$) of a reference fluid to the frequency $f_1$ of the flowing fluid $$\left[\frac{f_{1(REF)}}{f_1}\right]^2.$$

9. An apparatus as defined in claim 8 wherein:
said comparing means includes means for compensating said comparing means for variation in turbulent flow range of a measured fluid; and said modifying means comprises a multiplier for multiplying said squared ratio with said compensating signal.

10. An apparatus for obtaining a measure of fluid flow rate over the laminar, transitional and turbulent flow ranges comprising:

a turbine flowmeter located in a fluid flowline and producing an output frequency ($f$) variable with flowrate of the fluid;

means for converting said frequency to a voltage signal which increases from zero to selected constant reference voltage over the frequency output range produced during laminar and transitional flow through the flowmeter;

means for subtracting said voltage signal from said reference voltage in order to obtain an output voltage which becomes zero at all flowmeter output frequencies above the frequency ($f_1$) at which turbulent flow commences;

means responsive to said output voltage for generating a compensating signal for compensating the flowmeter output over the laminar and transitional flow ranges in accordance with the deviation of said frequency output of said flowmeter from a straight line function of flowrate present in the turbulent flow range; and means for combining said compensating signal with said flowmeter output to produce a correct flowmeter output measured throught the laminar and transitional flow ranges.

11. An apparatus as defined in claim 10 wherein:
said generating means produces a compensating signal which is a function of the ratio of the constant slope $G_o$ of the flowrate versus frequency curve during turbulent flow and the deviation from said constant slope $\Delta G$ with frequency during laminar and transitional flow ranges, said function being $$f \cdot \left(\frac{\Delta G}{G_o}\right).$$

12. An apparatus as defined in claim 11 wherein:
said generating means comprises a dioderesistor function generator for producing a value of said ratio as a function of frequency over the laminar and transitional flow ranges.

13. An apparatus as defined in claim 12 wherein:
said function generator comprises means for producing a plurality of successive straight line segments closely approximating the curve of $\Delta G$ versus frequency over the laminar and transitional flow ranges;

said producing means comprising the combination of a number of diode-resistor circuits;

a variable resistor bias for each diode for controlling the frequency range over which each diode will conduct; and each resistor in said circuits being variable for controlling the slope of the line segment produced by each circuit.

14. An apparatus as defined in claim 11 wherein:
said converting means comprises means for varying the frequency output ($f_1$) at which said voltage signal reaches said selected constant referenced voltage;

said frequency ($f_1$) corresponding to the frequency output at the start of the turbulent flow range.

15. An apparatus as defined in claim 14 having:
means for compensating the flowmeter output with a constant value $A/G_o$ which is proportional to the intercept A of said curve and inversely proportional to said constant slope $G_o$.

16. An apparatus as defined in claim 10 wherein said converting means comprises:

a diode pump circuit, a variable resistance in said circuit, the value of said resistance determining the frequency output ($f_1$) at which said voltage signal reaches said selected constant value;

said frequency ($f_1$) corresponding to the frequency output at the start of the turbulent flow range.

17. An apparatus as defined in claim 16 having
a zener diode for limiting the maximum output of said diode pump circuit to a value corresponding to said reference voltage.

18. An apparatus as defined in claim 10 having means for compensating the flowmeter output with a constant value $A/G_o$ which is proportional to the intercept A and inversely proportional to said constant slope $G_o$ of the flowrate versus frequency curve for turbulent flow.

19. An apparatus as defined in claim 10 having:
means for compensating for changes in viscosity of the fluid in said flow line, said means comprising means for adjusting said converting means for varying frequency ($f_1$).

20. An apparatus as defined in claim 19 having:
means for producing a signal equal to the squared ratio of frequency ($f_1$) of a reference fluid to frequency ($f_1$) of the flowing fluid $$\left[\frac{f_{1(REF)}}{f_1}\right]^2;$$

and
means for combining said squared ratio signal with said compensating signal in order to compensate the flowmeter output in the laminar and transitional flow ranges for variations in fluid viscosity.

21. An apparatus as defined in claim 20 wherein:

said combining means comprises a multiplier for multiplying said squared ratio with said compensating signal.

22. An apparatus as defined in claim 10 wherein:

said generating means produces a compensating signal which is a function of the ratio of the constant slope $G_o$ of the flowrate versus frequency curve during turbulent flow and the deviation from said constant slope $\Delta G$ with frequency during laminar and transitional flow ranges, said function being $$f\left(\frac{\Delta G}{G_o}\right);$$

and means for compensating the flowmeter output with a constant value $A/G_o$ proportional to said constant slope, A representing the intercept of said curve.

23. An apparatus as defined in claim 22 wherein:

means for compensating for changes in viscosity of the fluid in said flow line, said means comprising means for adjusting said converting means for varying frequency $(f_1)$.

24. An apparatus as defined in claim 23 wherein:

means for producing a signal equal to the squared ratio of frequency $(f_1)$ of a reference fluid to frequency $(f_1)$ of the flowing fluid $$\left[\frac{f_{1\,(REF)}}{f_1}\right]^2;$$

and means for combining said squared ratio signal with said compensating signal in order to compensate the flowmeter output in the laminar and transitional flow ranges for variations in fluid viscosity.

25. An apparatus as defined in claim 24 wherein:

said combining means comprises a multiplier for multiplying said squared ratio with said compensating signal.

26. A method for obtaining a measurement of fluid flowrate over the laminar, transitional and turbulent flow ranges comprising the steps of:

obtaining a frequency output signal from a turbine flowmeter which is variable with flowrate;

comparing said output signal with constant reference value to obtain a difference signal which reduces to zero at the start of the turbulent flow range and remains zero throughout the turbulent range; and compensating said difference signal with signal which represents the difference in actual flow rate in the laminar and transitional flow ranges from the flow rate indicated by the straight line function of flow rate versus frequency in the turbulent flow range, the compensated signal represented the actual flowrate in the laminar and transitional flow regions.

27. A method as defined in claim 26 including the step of:

compensating the difference signal for variation in the output signal at which turbulent flow commences.

28. A method as defined in claim 27 wherein:

the compensating of said difference signal includes producing with a function generator simultaneously successive straight line segments matching a plot of said flow rate difference against frequency.

29. A method as defined in claim 28 including the step of:

modifying said compensating signal with a signal which is a function of fluid viscosity.

30. A method as defined in claim 29 wherein:

said viscosity signal is the squared ratio of output signal of a reference fluid to the output signal of the flowing fluid $$\left[\frac{f_{1\,(REF)}}{f_1}\right]^2$$

corresponding to the condition when turbulent flow commences.

31. A method as defined in claim 30 comprising the step of:

multiplying the squared ratio with the modified compensating signal.

32. A method as defined in claim 26 including the step of:

compensating the difference signal with a constant signal value proportional to the constant slope of said straight line function.

33. A method as defined in claim 26 including the step of:

compensating the difference signal for variation in the output signal at which turbulent flow commences;

compensating the difference signal with a constant signal value proportional to the constant slope of said straight line function; and modifying said compensating signal with a signal which is a function of fluid viscosity.

34. An apparatus for obtaining a measure of fluid flow rate over the laminar, transitional and turbulent flow range comprising:

a flowmeter located in a fluid flow line and producing an output signal variable with flow rate;

means for comparing said output signal with a constant reference value to produce a different signal which is zero throughout the turbulent flow range of the fluid through the flowmeter;

means responsive to said difference signal for producing a compensating signal for compensating said output signal of said flow meter over the laminar and transitional flow ranges for variations from quantities indicated by the straight line function of flow rate versus output signal in the turbulent flow range; and means for combining said compensating signal with said flowmeter output signal to obtain a correct value of flow rate in the laminar and transitional flow ranges.

* * * * *